United States Patent [19]

Porter et al.

[11] 4,039,299
[45] Aug. 2, 1977

[54] MANUFACTURE OF PAPER FIRE LOGS

[76] Inventors: Clyde L. Porter, No. 5 Main St., Box 147, Franklin, Idaho 83237; Richard C. Porter, 1623 Halsey, Idaho Falls, Idaho 83401

[21] Appl. No.: 624,012

[22] Filed: Oct. 20, 1975

[51] Int. Cl.$^2$ .......................... C10L 5/22; F01B 29/00
[52] U.S. Cl. ............................................ 44/2; 93/77 R
[58] Field of Search .................................. 44/2, 11-13; 162/287; 93/77 R, 80

[56] References Cited

U.S. PATENT DOCUMENTS 634,191  10/1899  Truyter ................................ 93/77 R

OTHER PUBLICATIONS

"Logger", Logger Industries, P.O. Box 34275, Bethesda, Md. 20334.

Primary Examiner—Carl F. Dees
Attorney, Agent, or Firm—Lynn G. Foster

[57] ABSTRACT

An apparatus for manufacturing paper fire logs, the apparatus comprising a solution-containing reservoir above which is mounted a removable slotted, slit or split shaft through which the end of newspaper, magazine or the like is placed (and the shaft rotated either by a motor or manually) causing the paper to be rolled or wound upon the slotted shaft as it is passed through the solution in the reservoir, the paper being fed to the shaft along a tilting platform which is supported upon a knife edge for rotational purposes, one edge of the platform being bias against the roll of paper upon the slotted shaft but accommodating opposite rotation as the diameter of the paper upon the shaft increases. The wet paper fire log is removed from the apparatus by separating the slotted shaft from the remainder of the apparatus, squeezing the paper fire log and allowing it to dry.

6 Claims, 5 Drawing Figures

U.S. Patent  Aug. 2, 1977  4,039,299
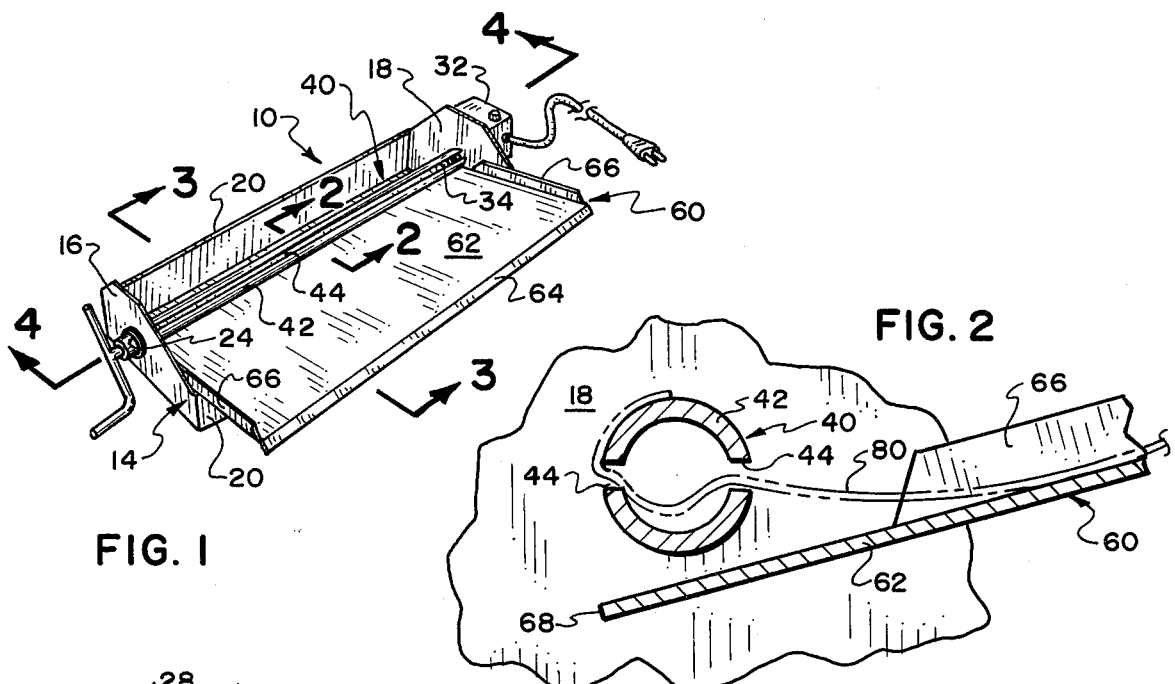
FIG. 1
FIG. 2
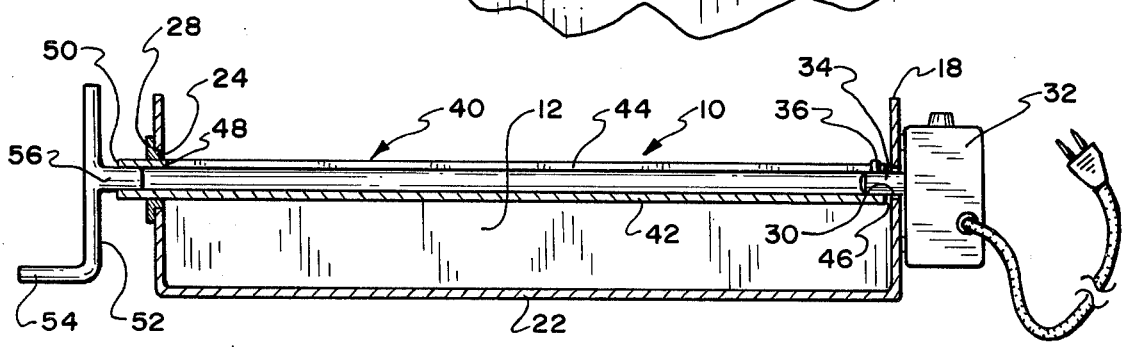
FIG. 4
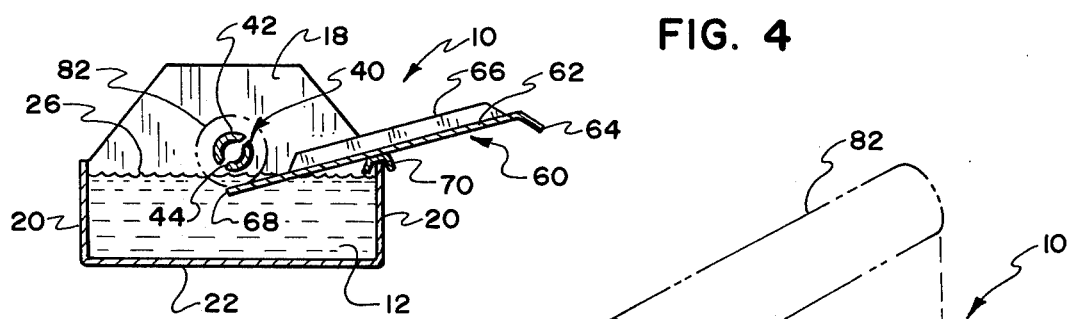
FIG. 3
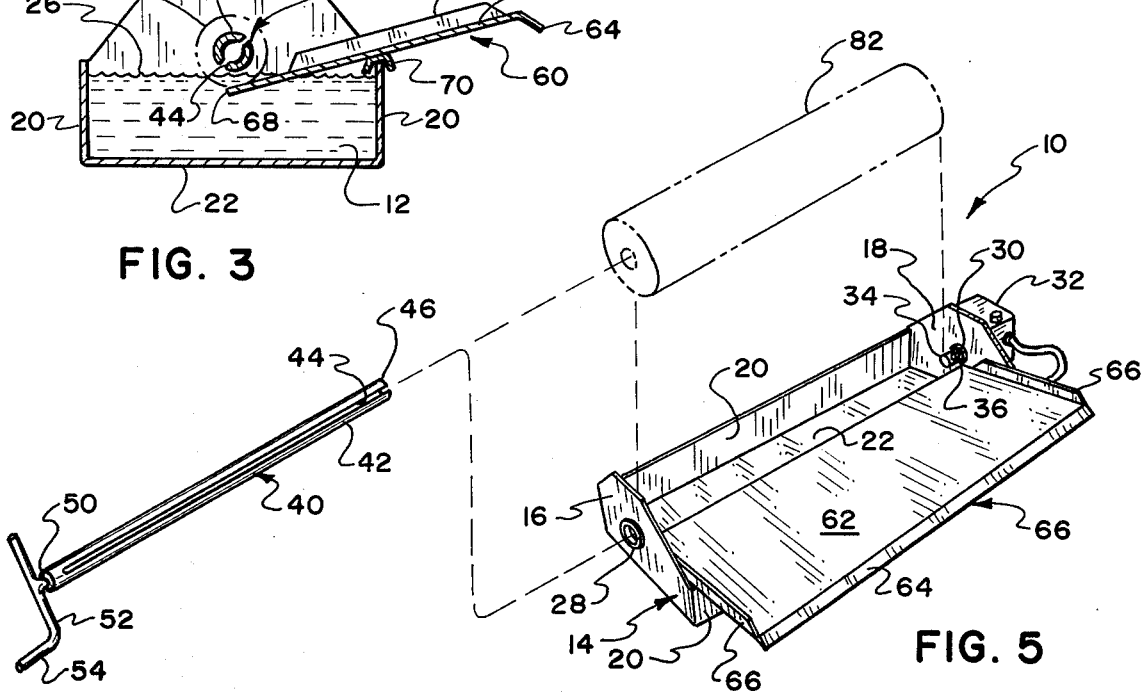
FIG. 5

MANUFACTURE OF PAPER FIRE LOGS

BACKGROUND

1. Field of Invention

The present invention relates generally to the manufacture of paper fire logs and more specifically to a novel apparatus for making paper fire logs whereby household refuge is reduced and fuel conserved.

2. Prior Art

Prior to the present invention, proposals have been made for producing paper fire logs from paper to be used as fuel. All such known prior art proposals have consisted of bulky and expensive equipment which has sometimes been difficult to use and awkward to store during non-use.

BRIEF SUMMARY AND OBJECTS OF THE INVENTION

In summary, the present invention comprises a relatively compact, economical and easily used apparatus for manufacturing paper fire logs from newspaper, magazines and like paper, the apparatus comprising a reservoir in which solution is located, a removable slotted or split shaft immediately above the reservoir adapted to be operated manually or by power and a platform pivotally mounted so that one edge thereof is bias toward the slotted shaft and engages the paper being wound upon the slotted shaft, the platform serving to feed the paper onto the shaft and causes it to be wound on the shaft during shaft rotation.

With the foregoing in mind, it is a primary object of the present invention to provide a novel and practical apparatus for manufacturing paper fire logs from paper and the like.

It is a further principal object of the present invention to provide an apparatus for manufacturing paper fire logs which utilizes a removable slotted or split shaft.

A further significant object of the present invention is the provision of an apparatus for manufacturing paper fire logs which utilizes a platform to feed incoming paper onto its shaft and to bias the paper against the shaft to insure that it is correctly wound thereon into a paper fire log.

These and other objects and features of the present invention will be apparent from the following detailed description, taken with reference to the accompanying drawings.

BRIEF DESCRIPTION OF THE DRAWINGS

FIG. 1 is a perspective representation of a presently preferred apparatus for manufacturing paper fire logs according to the present invention;

FIG. 2 is an enlarged cross-sectional view taken along the line 2—2 of FIG. 1;

FIG. 3 is a cross-sectional view of the apparatus of FIG. 1 taken along lines 3—3 of FIG. 1;

FIG. 4 is a cross-sectional view of the apparatus of FIG. 1 taken along lines 4—4 thereof; and FIG. 5 is an exploded perspective representation of the apparatus of FIG. 1.

DETAILED DESCRIPTION OF THE ILLUSTRATED EMBODIMENT

Reference is now made to the drawings which illustrate a presently preferred embodiment in accordance with the present invention, the embodiment being an apparatus for making a paper fire log from newspaper, magazines or like materials and is generally designated 10. The apparatus 10 comprises a reservoir 12 adapted to contain water, a soap solution or some other liquid (best illustrated in FIG. 3) to aid in consolidating the paper fire log being manufactured. The reservoir 12 being defined by tank 14 comprising end plates 16 and 18, side plates 20 and a bottom plate 22. The tank 14 may be fabricated of any suitable material, such as plastic or metal, with the described bottom wall, end walls and side walls being interconnected in fluid tight relation.

The end wall 16 has defined therein an aperture 24 immediately above the water line 26 of the reservoir 12, in which is disposed a bushing 28. The end wall 18 also has an aperture 30 therein at a location directly in horizontal alignment with the aperture 24. An electric motor 32, which may be any suitable electrical motor, is mounted at the exterior of the end wall 18 so that the drive shaft 34 thereof projects loosely through the aperture 30, with a transverse pin 36 projecting normal to the axis of the drive shaft 34.

A removable, hollow shaft 40, shown to be slotted or split, spans between the apertures 24 and 30, the diameter of which is slightly less than the inside diameter of the bushing 28 so that the slotted shaft 40 may be placed within and removed from the bushing 28 by manual manipulation. The shaft 40 may be of yieldable metal, plastic or other suitable material and is shown as comprising a hollow tube 42 having open ends, the tube 42 having opposed slots 44 together forming a slit, each slot extending from end 46 adjacent the motor 32 to a location 48 immediately adjacent the opposite end 50, the transverse pin 36 of the motor drive shaft 34 extending through the slit formed by slots 44 whereby motor rotation of the shaft 34 also rotates the tube 42. The slot or slit of the shaft is provided so that the diameter of the shaft is yieldable or may be constricted, accommodating reduction of said diameter to release the paper rolled upon it.

In the event that it is desired to either not provide an electrical motor or in the event the electrical motor 32 is inoperable or electrical power unavailable, a hand crank 52 is provided, the crank 52 comprising a handle portion 54 and a crank shaft 56 adapted to be nonrotatably placed within the hollow of the tube 42 and end 50 so that rotation of the crank 52 will likewise rotate the slotted shaft 40.

A platform generally designated 60 is also provided, the platform comprising a planar plate having an angular downwardly directed flange 64 along the outside exposed edge, two upwardly directed end flanges 66 and an edge 68 disposed immediately below the split shaft 40. A U or V-shaped mounting bar 70 is secured to the underside of the plate 62 and is placed over top of the side wall 20 of the tank 14 so that the side wall serves as a knife edge allowing the platform 20 to pivot thereon. By placing the mounting bar 70 appropriately, the platform 60 is caused to be out of balance creating a clockwise moment (as viewed in FIG. 3) whereby the end 68 of the plate 62 is caused to exert an upward force upon the split shaft 40 and paper being wound thereon. Thus, the platform 60 serves as a convenient vehicle for linearly feeding paper to the split shaft 40 and also exerts a force against the paper being wound upon the shaft 40 so as to correctly wind the paper to thereby create a paper fire log.

In use, a single sheet or superimposed multiple sheets of paper 80 (FIG. 2) are passed along the top surface of the plate 62 of the platform 60 through the slots 44 of the shaft 40 into the hollow interior thereof. The shaft 40 is rotated (manually or by power) and the paper is wound upon the shaft 40 with the end 68 of the plate 62 exerting pressure upon the paper being rolled upon the shaft 40 and the paper passing through the liquid or solution in the reservoir 14 (FIG. 3). As one sheet or superimposed sheets of paper are about to be completely rolled upon the shaft 40, an additional sheet or sheets of paper is overlapped upon the preceding sheet or sheets so that paper is continuously fed along the top surface of the platform 60 until the paper log 82 (FIGS. 3 and 5) has reached the overall diameter desired by the operator of the apparatus 10. At this point in time, rotation of the shaft 40 is discontinued. The diameter of the split shaft 40 is constricted and manually removed axially through the bushing 28 in a direction away from the motor 32 (as shown in FIG. 5) with the operator gripping and restraining the paper fire log 82 within the tank 14 so that the shaft 40 and paper fire log 82 are separated, following which the paper fire log may be rubbed on the surface by the operator to consolidate the surface and to cause the terminal edge of the paper forming the fire log 82 to better adhere to the remainder of the fire log. The paper fire log 82 is thereafter placed in a suitable location where it is allowed to dry. Later the paper fire log is used as fuel in a conventional fashion.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. An apparatus for making paper fire logs comprising:
    an open top tank in which a liquid is placed;
    an axially slotted shaft removably bridging between opposed walls of the tank;
    means removably and rotatably supporting the slotted shaft in said bridging position;
    platform means disposed to one side of the slotted shaft and spanning toward the slotted shaft along which paper is linearly displaced to and thereafter wound upon the slotted shaft;
    means for rotating the slotted shaft while in said bridging position;
    whereby paper the leading edge of which is received at the slot of the shaft is linearly displaced along the platform means, into the liquid and wound upon the shaft.

2. An apparatus according to claim 1 wherein said means supporting the slotted shaft comprise a bushing at one location and a motor shaft at the other and wherein said rotating means comprises a motor whereby the slotted shaft may be axially removed from the apparatus while restraining the roll of paper previously wound thereon.

3. An apparatus according to claim 1 wherein said rotating means comprises a manual crank.

4. An apparatus according to claim 1 wherein said shaft has material missing from the interior thereof whereby the effective diameter may be constricted to accommodate log removal.

5. An apparatus according to claim 1 wherein said platform means is pivotally carried by the apparatus and exerts a force against the paper upon the slotted shaft to aid in correctly winding the paper upon the slotted shaft, the liquid aiding in consolidation.

6. An apparatus according to claim 1 wherein said supporting means comprise bushing means whereby the slotted shaft may be axially removed from the remainder of the apparatus while restraining the paper previously wound thereon.

* * * * *

UNITED STATES PATENT AND TRADEMARK OFFICE
CERTIFICATE OF CORRECTION

PATENT NO.   : 4,039,299
DATED        : August 2, 1977
INVENTOR(S)  : Clyde L. Porter and Richard C. Porter It is certified that error appears in the above-identified patent and that said Letters Patent are hereby corrected as shown below:

The drawing depicted on the title page of the Patent is incorrect, and the proper title page drawing appears below:

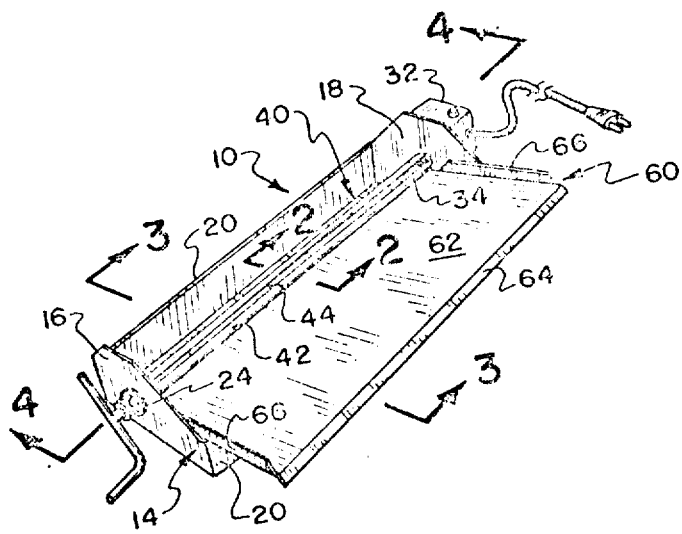

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*